United States Patent Office 2,840,328
Patented June 24, 1958

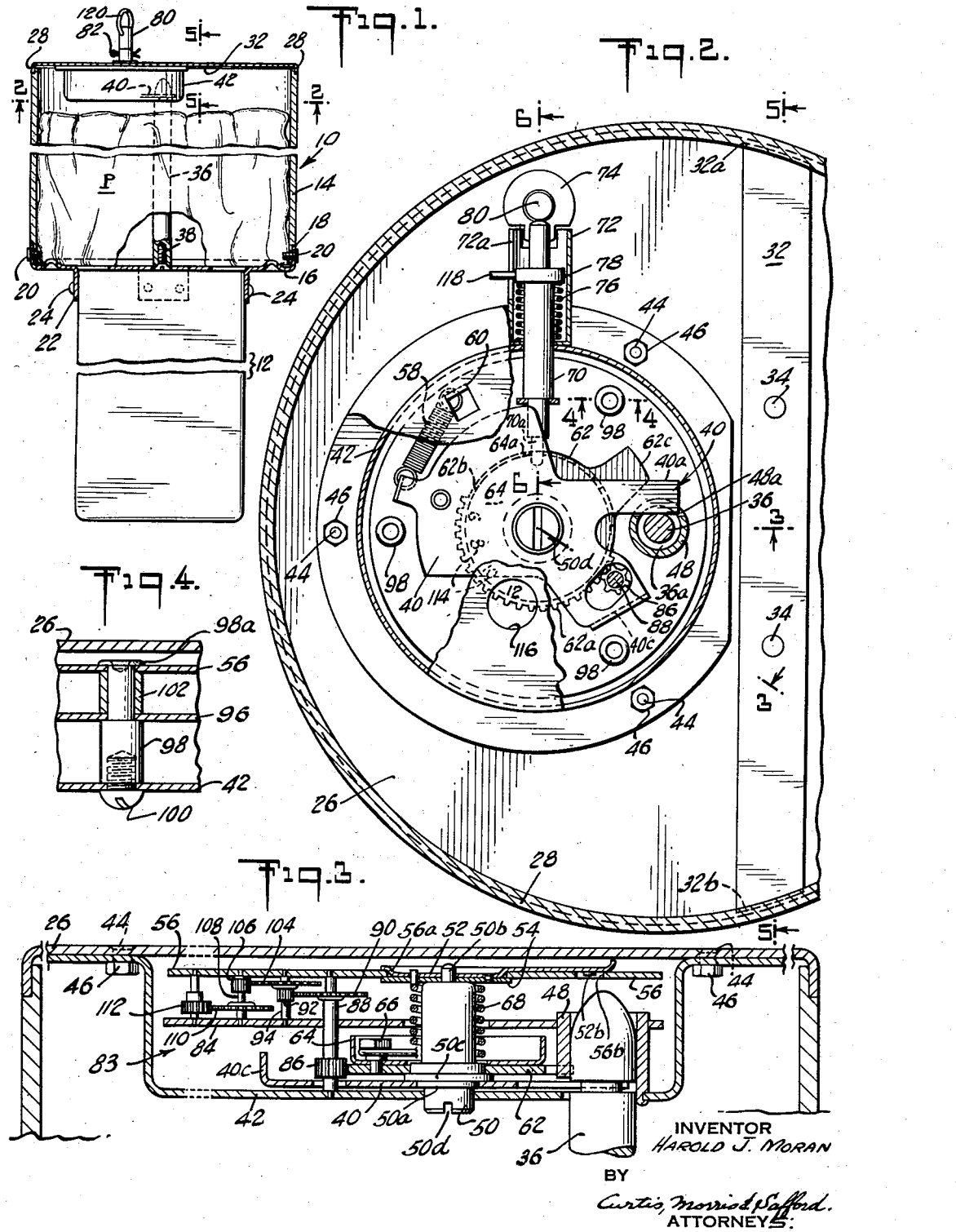

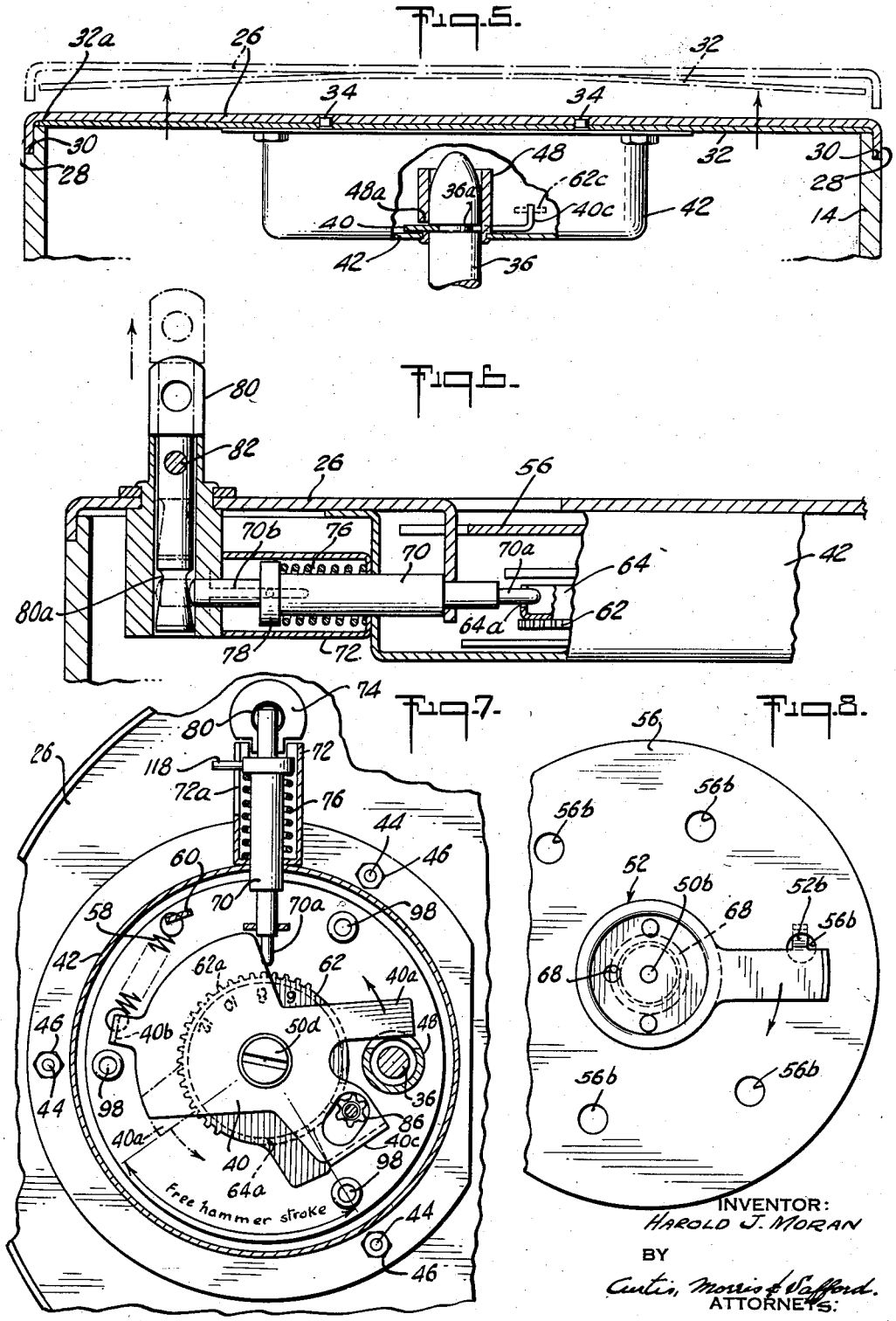

2,840,328

DELAYED OPENING PARACHUTE CONTAINER

Harold J. Moran, Trenton, N. J., assignor to Switlik Parachute Company, Inc., Trenton, N. J., a corporation of New Jersey Application December 12, 1955, Serial No. 552,457

4 Claims. (Cl. 244—150)

The present invention relates to delayed opening parachute containers of the type used, for example, to contain parachutes for supporting radio equipment which is dropped from aircraft in areas where there are no surface meteorological stations and which, during descent, transmits signals controlled in accordance with such variables as temperature, barometric pressure, humidity, etc.

If the parachute were opened immediately upon being dropped from a fast-flying airplane, the shock of sudden deceleration would be apt to damage the delicate radio equipment and perhaps the parachute itself. It is therefore common practice to provide apparatus for automatically opening the parachute container and releasing the parachute a predetermined time interval of the order of six to twelve seconds after it is dropped from the plane, thereby allowing the speed of the dropped equipment to decline to a safe level before the parachute is opened.

The delayed opening parachute equipment heretofore in use has been subject to various disadvantages, including, for example, an asymmetrical configuration with protruding parts which were apt to snag in the compartment from which the equipment is released, the use of rubber and similar elastic materials to provide the force necessary to open the container, such materials being subject to deterioration during storage and embrittlement at the low temperatures encountered at high altitudes, and the use of explosive charges actuated by powder-train time delay fuses, with the attendant hazards to personnel and equipment, the susceptibility to misfiring, etc.

It is therefore among the objects of the present invention to provide a delayed opening parachute mechanism which is free of the aforementioned disadvantages inherent in previous types of equipment, a container which is simple and inexpensive in construction, foolproof in operation, smooth and symmetrical in exterior conformation, and which does not employ either elastic actuating means or explosive timing means.

In the drawings:

Figure 1 is a side elevational view, partly in section, of a delayed opening parachute container embodying features of the present invention.

Figure 2 is a horizontal sectional view through the container, taken generally along the line 2—2 of Figure 1.

Figure 3 is a developed vertical sectional view of the segment of the container defined by the line 3—3 of Figure 2.

Figure 4 is a fragmentary vertical sectional view of the container taken generally along the line 4—4 of Figure 2.

Figure 5 is a vertical sectional view taken generally along the line 5—5 of Figure 2.

Figure 6 is a fragmentary vertical sectional view taken generally along the line 6—6 of Figure 2.

Figure 7 is a fragmentary view similar to Figure 2 but showing the mechanism in its released position.

Figure 8 is a fragmentary horizontal sectional view taken generally along the line 8—8 of Figure 3.

As may be seen in Figure 1, the complete equipment includes a parachute container generally indicated 10, which is adapted to enclose the parachute canopy P and the shroud lines, and a radio compartment generally indicated 12, which is adapted to house the radio equipment and the associated aerological instruments. The parachute container 10 is cylindrical in shape and includes a cup-like shell formed of a tubular body member 14 made, for example, from laminated kraft paper, and closed at one end by a metal base 16 having at its periphery an upstanding flange 18 within which the lower edge of the body member 14 is received and permanently secured by rivets 20. The base 16 is provided with three lanced-out tabs 22 which extend downwardly to serve as means for attachment of the radio compartment 12 by screws 24.

The upper end of the parachute container 10 is closed by a removable cover 26 which, as shown most clearly in Figure 5, is provided at its periphery with a downwardly-projecting flange 28 which is received in an external rabbet 30 at the upper edge of the tubular body 14 of the container.

As best shown in Figures 2 and 5, the cover 26 is urged upwardly away from the body 14 of the container by means of a leaf spring 32. This leaf spring 32 is secured to the inner face of the cover 26 by means of rivets 34 and extends straight across the cover 26 on a slightly eccentric chord with the opposite ends 32a and 32b of the spring shaped and positioned so as to lie closely against the inner wall of the flange 28 of the cover.

As shown in broken lines at the top of Figure 5, the spring 32 when relaxed has a bowed shape, with its ends 32a and 32b normally spaced below the inner surface of the cover 26. When the cover 26 is placed on the tubular body 14, as shown in full lines in Figure 5, the ends 32a and 32b of the spring are engaged by the upper edge of the body member 14 and pressed flat against the inner face of the cover. When the cover 26 is thus in place, the resilience of the spring 32 continually urges the cover upwardly away from the body member.

The cover 26 is normally held in position on the body member 14 against the force of the spring 32 by a post 36 which, as shown in Figure 1, is secured at its lower end to the base 16 of the container by means of a screw 38, and which extends upwardly within the container along its central axis. As shown in Figures 3 and 5, the upper end of the post 36 is provided with a notch 36a which is releasably engaged by the finger 40a of a latch member 40 of a timing mechanism contained in a shallow cup-like housing 42 which is secured at the inner face of the cover 26 by means of screws 44 and nuts 46.

As may be seen in Figure 5, the upper end of the post 36 is received in a bushing 48 which is attached at its lower end to the edge of an opening formed in the bottom wall of the housing 42. The bushing 48 is provided at one side with a slot 48a through which the finger 40a (Figure 2) of the latch member 40 extends into engagement with the notch 36a in the upper end of the post 36.

As may be seen in Figure 3, the locking member 40 is rotatably supported on a shoulder 50a formed on a shaft 50 of relatively large diameter which is rotatably supported at the central axis of the housing 42. The lower end of the shaft 50 is journalled in an opening in the bottom wall of the housing 42, while its upper end is provided with an axially projecting tip 50b which is received in openings in a tensioning lever 52 (see also Figure 8) and a backing disk 54 (Figure 3) which are rotatably supported in a circular opening 56a in the upper plate 56 of the timer mechanism.

As shown in Figure 7, the latch member 40 is urged in a clockwise direction by means of a coil spring 58 which is tensioned between an upstanding tab 40b on the latch member 40 and a tab 60 which is lanced out of the bottom wall of the housing 42. The spring 58 thus serves to maintain the finger 40a of the latch member in locking engagement with the slot 36a in the post 36 and retain the cover 26 of the container in closed position on the body 14 (Figure 5) against the force of the leaf spring 32.

The latch member 40 is moved into unlocking position at the appropriate time by means of an impact member 62 which is fixed on the shaft 50 and which is maintained in spaced, parallel relation to the latching member 40 by means of an integral collar 50c on the shaft 50. Attached to the upper face of the impact member 62 is a drum 64, these two members being keyed together by means of a stud 66. This impact assembly, comprising the shaft 50, impact member 62, and drum 64, is urged in a counterclockwise direction, as viewed in Figures 2 and 7, by means of a helical spring 68 (Figure 3) which is supported on the shaft 50, with the lower end of the spring 68 engaging the enlarged head of the stud 66, and its upper end being hooked through openings in the tensioning lever 52 and backing disk 54.

As may be seen in Figure 8, the tensioning lever 52 is "banjo-shaped" with its circular portion 52a being dished so that its edges and those of the backing disk 54 engage opposite faces of the upper supporting plate 56 of the timer mechanism, as shown in Figure 3, to rotatably support the tensioning lever 52 in the opening 56a in the upper plate 56. After assembly of the mechanism, the spring 68 may be pretensioned by rotation of the tensioning lever 52 in a clockwise direction, as viewed in Figure 8. The tensioning lever 52 is locked in position against the reactive force of the spring 68 by engagement of a tab 52b projecting from the tensioning lever into engagement with one of a series of holes 56b which are spaced at equal intervals around a circle concentric with the axis of rotation of the tensioning lever 52. The tab 52b has an inclined surface on the side facing in the direction of clockwise rotation of the tensioning lever 52, and the lever 52 is formed of a relatively thin, springy material so that as it is rotated in a clockwise direction to tension the spring 58, the tab 52b will be cammed up out of the holes 56b. However, the opposite side of the tab 52b is shaped so that it will not cam out of the holes 56b but will lock the lever 52 against counterclockwise rotation.

Once tensioned, the spring 68 continually urges the impact assembly in a counterclockwise direction, as viewed in Figure 2. However, the impact assembly is normally retained, against the force of the spring 68, in one of several retracted positions, in one of which it is shown in Figure 2, by a locking rod 70 having an inner end 70a of reduced diameter which is adapted to engage one of several notches 64a in the drum 64 secured to the impact member 62.

As shown in Figures 2, 6 and 7, the locking rod 70 extends through an opening in the side wall of the housing 42 and through a thimble 72 which extends between the wall of the housing 42 and a socket 74 which is secured to and depends from the cover 26 of the container. The outer end portion 70b of the locking rod is of somewhat reduced diameter and extends through an opening in the wall of the socket 74, as best shown in Figure 6. The locking rod 70 is urged outwardly (leftwardly as viewed in Figure 6) by means of a helical spring 76 which encircles the rod 70 and is compressed between the end wall of the thimble 72 and a collar 78 integrally formed on the rod 70. The locking rod 70 is normally maintained against the force of the spring 76 in the inner position in which it is shown in Figure 6, and in which its inner end 70a is in locking engagement with one of the notches 64a in the drum 64, by means of a firing pin 80 which is slidably received in the socket 64 and which engages the outer end 70b of the locking rod 70.

During period of storage and handling prior to actual use of the parachute equipment, it is maintained in a safe condition by means of a cotter pin 82 (Figure 1) which extends through holes in the outer portion of the socket 74 and in the shank of the firing pin 80. The cotter pin 82 is removed to place the equipment in a "ready" condition.

Even after the cotter pin 82 has been removed, the firing pin 80 is normally retained in its inner position, shown in full lines in Figure 6, by engagement of the spring-loaded locking rod 70 with a conically tapered portion 80a at the lower end of the firing pin 80. However, the firing pin 80 can be pulled upwardly by moderate force, causing the tapered portion 80a of the firing pin to cam the locking rod 70 inwardly (to the right, as viewed in Figure 6) against the force of the spring 76 to allow the inner end of the firing pin 80 to clear the end 70b of the locking rod 70. When this occurs, the spring 76 forces the locking rod 70 outwardly to the position shown in broken lines, at which the inner end 70a of the locking pin is out of engagement with the notch 64a in the drum 64.

This frees the impact assembly for movement in a counterclockwise direction, as viewed in Figure 2, under the influence of the spring 68 (Figure 3). However, during the initial travel of the impact assembly, its rate of movement is controlled by a clockwork mechanism which is generally indicated 83 (Figure 3) and which is supported by the aforementioned upper support plate 56 and an intermediate support plate 84.

As shown in Figure 4, the two support plates 56 and 96 are maintained in spaced, parallel relation to the bottom wall of the housing 42 by means of three spacer rods 98, one of which is shown in detail in Figure 4, the spacer rods being attached to the bottom wall of the housing 42 by means of screws 100 and the upper ends of the spacer rods 98 being staked over against the upper face of the upper support plate 56 as indicated at 98a. The spacing of the upper plate 56 and the intermediate plate 96 is maintained by spacing collars 102 interposed between these plates and received on the reduced upper portions of the spacing rods 98.

As may be seen in Figure 2, the impact member 62 is provided, around some 180° of its periphery, with a series of spur gear teeth 62a which mesh with a pinion 86 fixed near the lower end of a shaft 88. The shaft 88 is journalled at its opposite ends in the bottom wall of the housing 42 and in the upper support plate 56. The shaft 88 also carries a spur gear 90 which forms part of a train of gears fixed on shafts journalled in the upper support plate 56 and the intermediate support plate 96.

As may be seen in Figure 3, this train of gears includes a pinion meshing with the spur gear 90, this pinion being fixed on a shaft 94, a spur gear 104 fixed on the same shaft 94 and meshing with a pinion 106 on a shaft 108, and a spur gear 110 fixed on the same shaft 108. This spur gear 110 cooperates with a conventional escapement 112 which allows the spur gear 110 to rotate through incremental distances equivalent to the pitch of its teeth each time the escapement completes one oscillation.

Because of the inertia of the escapement 112, its frequency of oscillation is limited, and the rate of rotation of the impact assembly is thus controlled during the portion of its movement when the gear teeth 62a are in engagement with the pinion 86. However, as previously mentioned, the gear teeth 62a extend around only a limited segment of the periphery of the impact member 62 and the adjacent portion 62b of the impact member is a slightly reduced diameter so that when this portion 62b of the impact member reaches the pinion 86, there is no further engagement between the impact member 62 and the pinion, and the impact assembly 62 is allowed to rotate freely under the influence of the spring 68 (Figure 3). The reduced portion 62b of the impact member 62 occupies approximately 90° of its periphery so that the impact assembly is allowed to accelerate to a substantial velocity and achieve a substantial momentum.

Projecting radially from the impact member 62 is a finger 62c (Figure 2) which is adapted to engage an upstanding tab 40c (Figures 2 and 3) on the latch member 40. The finger 62c and the tab 40c are so positioned that the finger engages the tab at the completion of the 90° free movement of the impact member. The impact member thus strikes the latch member 40 a forceable blow sufficient, as shown in Figure 7, to move the latching member 40 momentarily a short distance in a counterclockwise direction against the force of the spring 58. This removes the finger 40a of the latching member 40 from engagement in the notch 36a in the post 36 and allows the leaf spring 32 (Figure 5) to move the cover 26 off of the cylindrical body 14 of the container, as shown in broken lines in Figure 5.

This opens the container, and, as the parachute falls, the cover 26 is carried away from the container 10 by air current. The parachute canopy P contained within the container 10 is attached at its peak to the cover 26 and is pulled out of the container by the cover, causing the air to catch the canopy and inflate it.

As previously mentioned, the drum 64 is provided with a plurality of notches, allowing the impact assembly to be preset at any of several rotational positions corresponding to various time delay intervals. In the particular embodiment illustrated, four notches are provided, corresponding respectively to delay intervals of six, eight, ten, and twelve seconds. In Figure 2, the mechanism is shown set for a a twelve-second delay interval.

In order to facilitate setting of the timer, the impact member 62 is provided at its lower face with a plurality of numerals 114 corresponding to the various delay intervals. These numerals are visible through a circular window 116 (Figure 2) in the lower wall of the housing 42. In Figure 2, the numeral 12 is shown visible through the window 116, indicating that the notch 64a in the drum 64 corresponding to a twelve-second delay interval is aligned with the locking rod 70.

To set the timer, the impact mechanism is rotated in a clockwise direction, as viewed in Figure 2, by means of a screwdriver slot 50d (Figures 2 and 3) formed in the lower end of the shaft 50 which protrudes from the bottom wall of the housing 42. When the impact assembly has been rotated to the position corresponding to the desired time delay interval, at which position the appropriate numeral 114 will be visible through the window 116, the locking rod 70 is moved into the opposite slot 64a in the drum 64, against the force of the spring 76, by means of a cocking pin 118 (Figure 2) which projects from the collar 78 on the locking rod 70 through an elongated slot 72a in the side wall of the thimble 72. When the locking rod 70 has thus been brought into locking position, it is maintained in this position against the force of the spring 76 by inserting the firing pin 80 in the socket 74.

The cover 26 is then placed on the body member 14, with the tapered upper end of the post 36 entering the bushing 48 and engaging the finger 40a of the latch member 40 to cam the latch member in a counterclockwise direction (as viewed in Figure 2) against the force of the spring 58. When the finger 40a reaches the notch 36a in the post 36, it snaps into the notch, locking the cover 26 in position on the body member 14.

In customary use, the firing pin 80 is attached by means of a ring 120 at its upper end to one end of a static line the opposite end of which is secured to the frame of the aircraft. The parachute container is stored in a compartment in the bottom of the aircraft fuselage, the compartment being closed by a trap door at its lower side. When it is desired to release the parachute, the trap door is opened, allowing the parachute container to drop from the compartment. When the full length of the static line is reached, the firing pin 80 is pulled, releasing the locking rod 70 and freeing the impact assembly to move first at a controlled rate through the desired time delay interval and ultimately at a free rate until it forcibly strikes the latch member 40 and moves it momentarily from engagement with the notch 36a in the post 36, allowing the spring 32 to move the cover 26 off of the container.

From the foregoing description, it will be appreciated that the present invention provides a parachute container which is free from the aforementioned disadvantages of previous types of containers. However, it should be emphasized that the particular embodiment of the invention shown and described herein is intended as merely illustrative and not as restrictive of the invention.

I claim:

1. A delayed opening parachute pack comprising a container including a cup-like shell member open at one end and adapted to receive a parachute, and a cover member adapted to said open end, a first spring means urging said cover member away from said shell member, a latch movably mounted on one of said members, a second spring means normally urging said latch into interlocking engagement with a part of the other of said members, an impact member movably mounted on said one member, a third spring means urging said impact member toward said latch, a lock engaging said impact member and normally holding the same in a retracted position against the force of said third spring means, means attachable to a static line for actuating said lock to release said impact member for movement by said third spring means toward said latch, a clockwork mechanism including a governor limiting the rate of operation thereof, and drive means connecting said impact member and said clockwork mechanism during the first portion only of the movement of said impact member, whereby pulling said static line actuates said lock to release said impact member for movement toward said latch initially at a controlled rate and ultimately at a free rate until it forcibly strikes said latch and moves the same against the resistance of said second spring means to disengage said latch from said other member and allow said first spring means to move said cover member away from said shell member to release said parachute.

2. A delayed opening parachute pack comprising a container including a cup-like shell member open at one end and adapted to receive a parachute, and a cover member adapted to close said open end, a first spring means urging said cover member away from said shell member, a post connected at one end to the bottom of said shell member and extending lengthwise along the interior thereof and having a notch near its free end, a housing at the inner face of said cover member, said housing having an opening to admit the free end of said post and enclosing a delayed-opening mechanism including a movably mounted latch, a second spring means normally urging said latch into engagement with the notch in said post, a movably mounted impact member, a third spring means urging said impact member toward said latch, a lock engaging said impact member and normally holding the same in a retracted position against the force of said third spring means, means attachable to a static line for actuating said lock to release said impact member from movement by said third spring means toward said latch, a clockwork mechanism including a governor limiting the rate of operation thereof, and drive means connecting said impact member and said clockwork mechanism during the first portion only of the movement of said impact member, whereby pulling said static line actuates said lock to release said impact member for movement toward said latch initially at a controlled rate and ultimately at a free rate until it forcibly strikes said latch and moves the same against the resistance of said second spring means to disengage said latch from said notch and allow said first spring means to move said cover member away from said shell member to release said parachute.

3. A delayed opening parachute pack comprising a container including a cup-like shell member open at one end and adapted to receive a parachute, and a cover member adapted to close said open end, a first spring means urging said cover member away from said shell member, a post connected at one end to the bottom of said shell member and extending lengthwise along the interior thereof and having a notch near its free end, a relatively shallow cup-like housing secured to the inner face of said cover member, said housing having an opening to admit the free end of said post and enclosing a delayed-opening mechanism including a movably mounted latch, a second spring means normally urging said latch into engagement with the notch in said post, a rotatably mounted impact member having a projecting portion adapted for engagement with said latch at one point in the rotation of said impact member to urge said latch in a direction away from said post, a coil spring urging said impact member to rotate so as to bring said projecting portion of said impact member into such engagement with said latch, a lock engaging said impact member and normally holding the same in a retracted position against the force of said coil spring, means attachable to a static line for actuating said lock to release said impact member for movement by said coil spring toward said latch, a clockwork mechanism including a governor limiting the rate of operation thereof, and gear drive means including a selector gear connecting said impact member and said clockwork mechanism during the first portion only of the rotation of said impact member, whereby pulling said static line actuates said lock to release said impact member for rotation toward said latch initially at a controlled rate and ultimately at a free rate until it forcibly strikes said latch and moves the same against the resistance of said second spring means to disengage said latch from said notch and allow said first spring means to move said cover member away from said shell member to release said parachute.

4. A delayed opening parachute pack comprising a container including a cup-like shell member open at one end and adapted to receive a parachute, and a cover member adapted to close said open end, a first spring means urging said cover member away from said shell member, a latch movably mounted on one of said members, a second spring means normally urging said latch into interlocking engagement with a part of the other of said members, an impact member movably mounted on said one member, a third spring means urging said impact member toward said latch, a movably mounted lock adapted to engage said impact member and hold the same in a retracted position against the force of said third spring means, a fourth spring means urging said lock out of engagement with said impact member, a movably mounted stop normally engaging said lock and holding the same in engagement with said impact member against the force of said fourth spring means, said stop being provided with means for actuation by a static line to move said stop from engagement with said lock, a clockwork mechanism including a governor limiting the rate of operation thereof, and drive means connecting said impact member and said clockwork mechanism during the first portion only of the movement of said impact member, whereby pulling said static line moves said stop from engagement with said lock, allowing said fourth spring means to move said lock from engagement with said impact member and releasing said impact member for movement toward said latch initially at a controlled rate and ultimately at a free rate until it forcibly strikes said latch and moves the same against the resistance of said second spring means to disengage said latch from said other member and allow said first spring means to move said cover member away from said shell member to release said parachute.

References Cited in the file of this patent
UNITED STATES PATENTS

| 1,858,609 | Zipser | May 17, 1932 |
| 2,476,969 | Fogal | July 26, 1949 |

FOREIGN PATENTS

| 601,815 | France | Dec. 11, 1925 |